US012745079B2

(12) United States Patent
Rajendran et al.

(10) Patent No.: US 12,745,079 B2
(45) Date of Patent: Sep. 22, 2026

(54) METHOD AND SYSTEM FOR AUTHORIZING A MISSION CRITICAL SERVICES (MCX) SERVER

(71) Applicant: Samsung Electronics Co., Ltd., Suwon-si (KR)

(72) Inventors: Rohini Rajendran, Bangalore (IN); Rajavelsamy Rajadurai, Bangalore (IN); Kiran Gurudev Kapale, Bangalore (IN); Nivedya Parambath Sasi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 18/727,236

(22) PCT Filed: Jan. 5, 2023

(86) PCT No.: PCT/KR2023/000247

§ 371 (c)(1),
(2) Date: Jul. 8, 2024

(87) PCT Pub. No.: WO2023/132667

PCT Pub. Date: Jul. 13, 2023

(65) Prior Publication Data

US 2025/0097701 A1 Mar. 20, 2025

(30) Foreign Application Priority Data

Jan. 6, 2022 (IN) ............................ 202241000871
Dec. 26, 2022 (IN) ............................ 202241000871

(51) Int. Cl.
*H04W 12/06* (2021.01)
*G06F 21/62* (2013.01)
(Continued)

(52) U.S. Cl.
CPC ............ *H04W 12/06* (2013.01); *G06F 21/62* (2013.01); *H04L 67/02* (2013.01); *H04L 63/08* (2013.01); *H04W 4/12* (2013.01)

(58) Field of Classification Search
None
See application file for complete search history.

(56) References Cited

U.S. PATENT DOCUMENTS 8,931,068 B2 * 1/2015 Haynes ................... G06F 21/44 713/186
10,079,822 B2 * 9/2018 Stojanovski .......... H04W 12/08
(Continued)

FOREIGN PATENT DOCUMENTS

IN 202041006344 A 8/2021
WO 2018/212571 A1 11/2018

OTHER PUBLICATIONS

Samsung et al., Depositing file contents distributed via FD communication using HTTP into MCData message store, S6-202147, 3GPP TSG-SA WG6 Meeting #40-e, Nov. 11, 2020.
(Continued)

*Primary Examiner* — Lashonda Jacobs-Burton
(74) *Attorney, Agent, or Firm* — Jefferson IP Law, LLP

(57) ABSTRACT

The disclosure relates to a 5G or 6G communication system for supporting a higher data transmission rate. Disclosed herein is method and system for authorizing a MCX server. An authorization server is configured to receive a validation request from a MCData message store in response to a user account access request received by MCData message store from MCX server. Further, authorization server is configured to validate identification information of MCX server. Further, authorization server is configured to transmit a validation response to MCData message store indicating authorization of MCX server to access user account in MCData message store, upon successful validation of iden-
(Continued)

tification information of tMCX server. An authorization server is introduced to provide additional layer of security to user account with MC Data.

16 Claims, 8 Drawing Sheets

(51) Int. Cl.
*H04L 67/02* (2022.01)
*H04L 9/40* (2022.01)
*H04W 4/12* (2009.01)

(56) References Cited

U.S. PATENT DOCUMENTS

| | | | | |
|---|---|---|---|---|
| 10,425,450 | B2 * | 9/2019 | Atarius | H04L 65/1016 |
| 10,638,524 | B2 * | 4/2020 | Kapatralla | H04L 65/4038 |
| 10,708,928 | B2 * | 7/2020 | Pattan | H04W 4/90 |
| 11,019,465 | B2 * | 5/2021 | Gundur | H04W 4/08 |
| 11,343,657 | B2 * | 5/2022 | Pattan | H04W 24/02 |
| 11,792,609 | B2 * | 10/2023 | Gundur | H04W 12/041 455/404.1 |
| 2014/0380426 | A1 * | 12/2014 | Lin | G06F 21/31 726/4 |
| 2017/0223005 | A1 * | 8/2017 | Birgisson | H04L 63/083 |
| 2017/0251029 | A1 * | 8/2017 | Atarius | H04W 8/18 |
| 2018/0359612 | A1 * | 12/2018 | Buckley | H04L 65/611 |
| 2019/0037617 | A1 * | 1/2019 | Kapatralla | H04L 65/1073 |
| 2019/0044980 | A1 * | 2/2019 | Russell | H04L 65/1073 |
| 2019/0313422 | A1 * | 10/2019 | Pattan | H04L 47/2433 |
| 2020/0036525 | A1 * | 1/2020 | Han | G07C 9/27 |
| 2020/0120454 | A1 * | 4/2020 | Gundur | H04L 65/1016 |
| 2020/0187294 | A1 | 6/2020 | Ge et al. | |
| 2021/0243593 | A1 * | 8/2021 | Ge | H04W 8/186 |
| 2022/0141281 | A1 | 5/2022 | Ramamoorthy et al. | |
| 2023/0128813 | A1 * | 4/2023 | Babani | G06F 21/6245 726/4 |

OTHER PUBLICATIONS

Airbus et al., [33.180] R17 Fix terminology, S3-202881-r1, 3GPP TSG-SA WG3 Meeting #101-e, Nov. 18, 2020.

Motorola Solutions, [33.180] MCData message store security, S3-201648, 3GPP TSG-SA WG3 Meeting #100-e, Aug. 7, 2020.

International Search Report dated Apr. 3, 2023, issued in International Application No. PCT/KR2023/000247.

Indian Office Action dated Apr. 15, 2024, issued in Indian Patent Application No. 202241000871.

3rd Generation Partnership Project; Technical Specification Group Services and System Aspects; Functional architecture and information flows to support Mission Critical Data (MCData); Stage 2 (Release 16), 3GPP TS 23.282 V16.8.0 (Dec. 2020), Dec. 18, 2020, pp. 1-187, XP051999845.

3rd Generation Partnership Project; Technical Specification Group Services and System Aspects; Security of the Mission Critical (MC) service; (Release 17), 3GPP TS 33.180 V17.5.0 (Dec. 2021), Dec. 23, 2021, pp. 1-204, XP052083357.

3GPP Third Generation Partnership Project; Draft Meeting Report for TSG CT WG1 meeting: 122e, Electronic, Apr. 9, 2020, XP052306940.

Extended European Search Report dated Feb. 25, 2025, issued in European Patent Application No. 23737415.2.

* cited by examiner

Figure 4B:
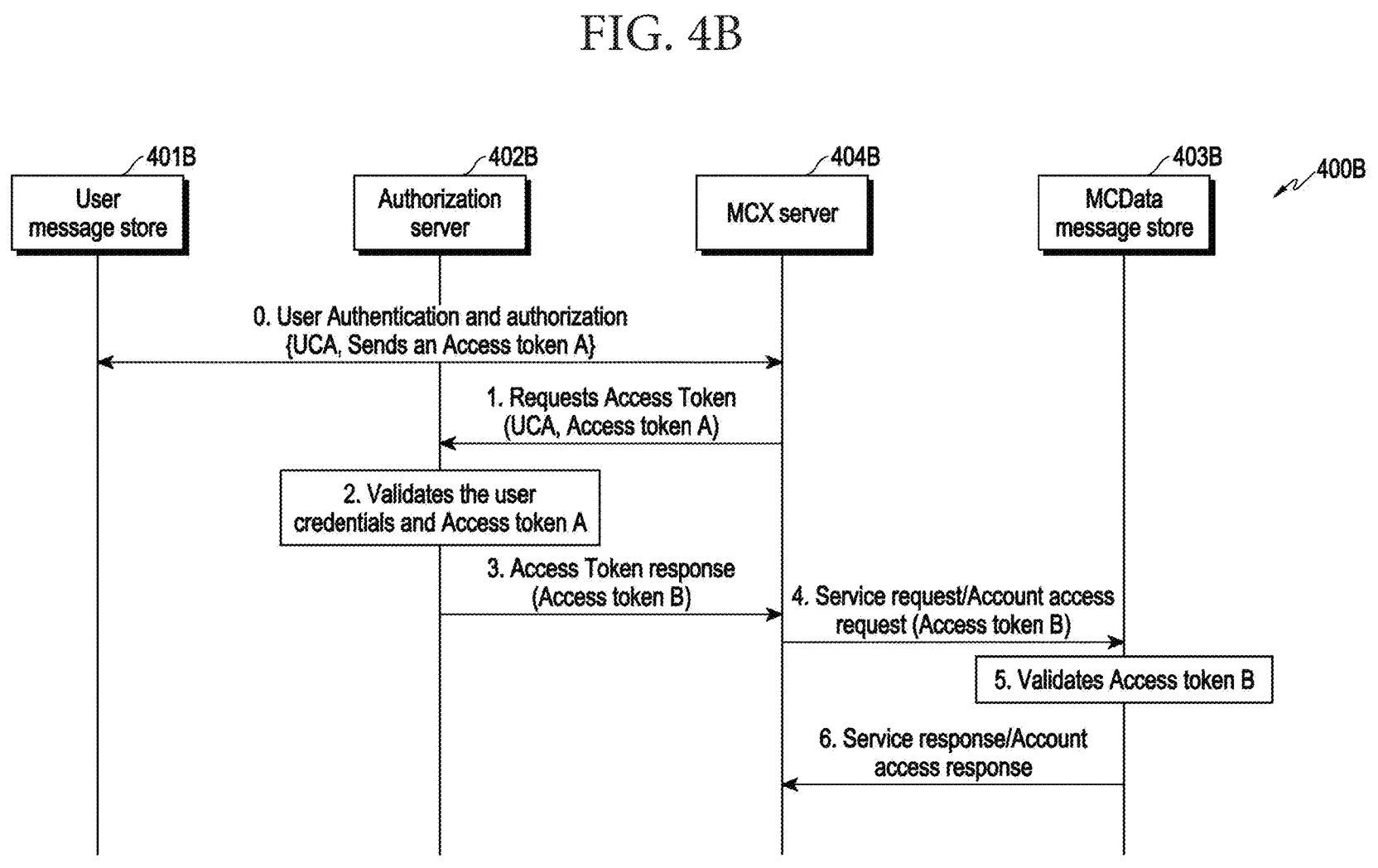

401B User message store

402B Authorization server

404B MCX server

403B MCData message store

0. User Authentication and authorization {UCA, Sends an Access token A}

1. Requests Access Token (UCA, Access token A)

2. Validates the user credentials and Access token A

3. Access Token response (Access token B)

4. Service request/Account access request (Access token B)

5. Validates Access token B

6. Service response/Account access response

Figure 4C:
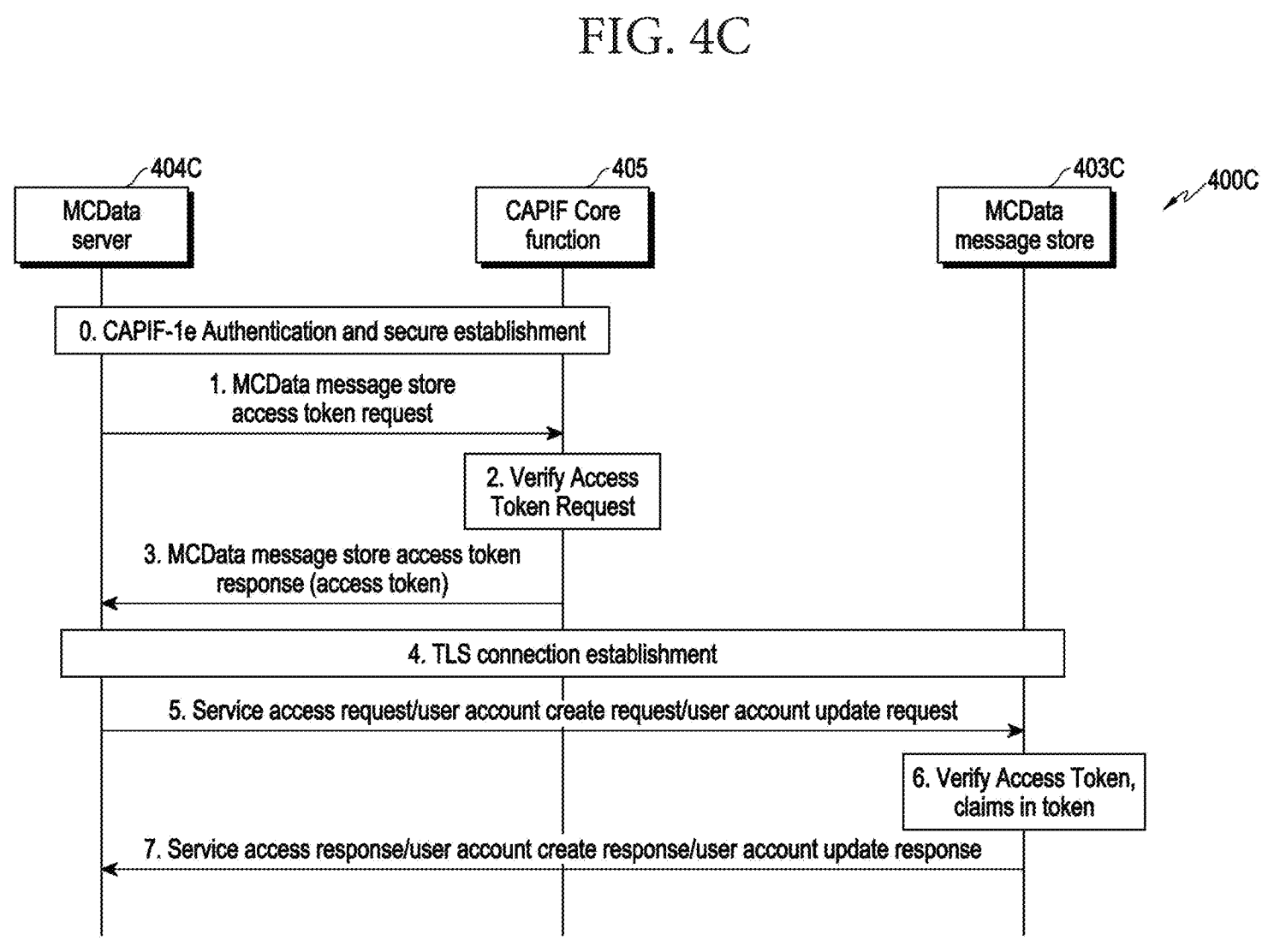

404C MCData server

405 CAPIF Core function

403C MCData message store

0. CAPIF-1e Authentication and secure establishment

1. MCData message store access token request

2. Verify Access Token Request

3. MCData message store access token response (access token)

4. TLS connection establishment

5. Service access request/user account create request/user account update request 6. Verify Access Token, claims in token 7. Service access response/user account create response/user account update response

Figure 5:
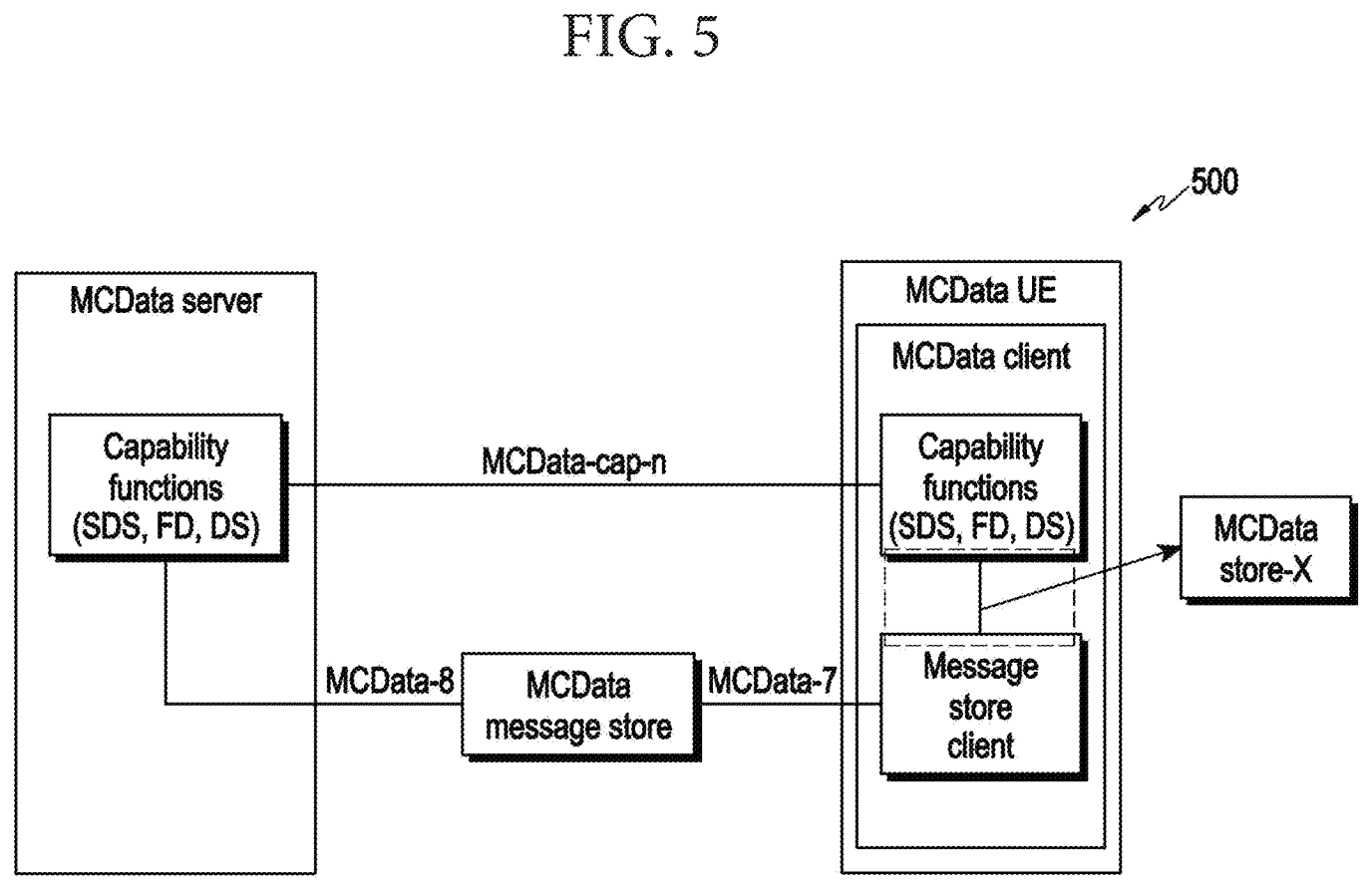

MCData store-X

MCData UE

MCData client

Capability functions (SDS, FD, DS)

Message store client

MCData-cap-n

MCData-7

MCData message store

MCData-8

MCData server

Capability functions (SDS, FD, DS)

METHOD AND SYSTEM FOR AUTHORIZING A MISSION CRITICAL SERVICES (MCX) SERVER

CROSS-REFERENCE TO RELATED APPLICATION(S)

This application is a U.S. National Stage application under 35 U.S.C. § 371 of an International application number PCT/KR2023/000247, filed on Jan. 5, 2023, which is based on and claims priority of an Indian Patent Application number 202241000871, filed on Jan. 6, 2022, in the Indian Patent Office, and of an Indian Patent Application number 202241000871, filed on Dec. 26, 2022, in the Indian Patent Office, the disclosure of each of which is incorporated by reference herein in its entirety.

TECHNICAL FIELD

The present disclosure relates, in general, to Mission Critical Exchange service (MCX). Particularly, the present disclosure relates to a method and a system for authorizing a MCX server.

BACKGROUND ART 5G mobile communication technologies define broad frequency bands such that high transmission rates and new services are possible, and can be implemented not only in "Sub 6 GHz" bands such as 3.5 GHZ, but also in "above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

A MCData message store is a network base persistent store which allows mission critical system to configure MCData users to permanently store their MCData communications. Further, the MCData message store provides a secured storage area for each of the authorized MCData user having a user account. The storage area may be identified by the MCData user's ID. Further, the MCData message store may allow the MCData user to access the storage area that he/she is authorized to access. A user or a dispatcher who is not having a user account may access an account holder's storage area if authorized.

In conventional systems, during an active MCData communication, a participating function on the MCX server of the MCData user participant may, if the configuration to store the MCData communication is enabled, and if requested by the MCData user, deposit messages and files exchanged in a communication to a MCData user's storage area in the MCData message store. Further, when depositing the MCData communication into the MCData message store, if no such MCData user account is available on the MCData message store, the MCX server may create the user account first and then MCData message store may deposit the MCData communications. Additionally, the MCData message store may support user account creation and deposit the MCData communications operations from the MCX server after successful authentication and authorization. Also, the MCData message store may support the user message store to retrieve, update, delete, search, and synchronize the MCData communications stored in the MCData message store, after successful authentication and authorization.

Further, in the conventional systems, reference points MCData-7 and MCData-8 provide direct communications with the MCData message store from MCData User Equipment (UE) message store and the MCX server capabilities function, respectively. As per the defined security procedure in TS 33.180, an Hyper-Text Transfer Protocol (HTTP) requests from the user message store to the MCData message store which may include an appropriately scoped access token for MCData message store access. If the access token cannot be validated by the MCData message store, then the HTTP request may be rejected. To validate access tokens, the MCData message store may validate the signature of the access token. The conventional method provides the MCData message store with the Integrated Database Management System (IDMS) signature validation credentials. However, the conventional systems only disclose authorizing the request received from the user message store, but there is no disclosure about authorizing MCX server that accesses account owned by the user in the MCData message store.

As explained above, the MCX server of a MCData user participant, if the configuration to store the MCData communication is enabled and if requested by the MCData user, deposits messages and files exchanged in the conversation to the MCData user's storage area in the MCData message store. The conventional systems may lack the details on authorization of MCX server by MCData Message Store to access the account owned by MCX user or to create such user account, if not available. Currently, MCX server is able to access account owned by the user in the MCData message store without authorization from the user.

The information disclosed in this background of the disclosure section is only for enhancement of understanding of the general background of the invention and should not be taken as an acknowledgement or any form of suggestion that this information forms the prior art already known to a person skilled in the art.

DISCLOSURE

Technical Solution

Disclosed herein is a method for authorizing a MCX server. The method comprises receiving a validation request from the Mission Critical (MC) Data message store in response to a user account access request received by the MCData message store from the MCX server. The validation request comprises identification information of the MCX server and MCData User Identifier (ID). The method further comprises validating the identification information of the MCX server based on access information of a user account corresponding to the MCData User ID stored in authorization server. The method further comprises transmitting a validation response to the MCData message store indicating authorization of the MCX server to access the user account in the MCData message store, upon successful validation of the identification information of the MCX server.

Further, the present disclosure relates to an authorization server for authorizing a Mission Critical Services (MCX) server. The authorization server comprises a processor and a memory. The memory is communicatively coupled to the processor and the memory stores instructions. Executing the instructions, cause the processor to receive a validation request from a Mission Critical (MC) Data message store in response to a user account access request received by the MCData message store from the MCX server. The validation request comprises identification information of the MCX server and MCData User Identifier (ID). Further, the processor validates the identification information of the MCX server based on access information of a user account corresponding to the MCData User ID stored in the authorization server. Thereafter, the processor transmits a validation response to the MCData message store indicating authorization of the MCX server to access the user account in the MCData message store, upon successful validation of the identification information of the MCX server.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIGS. 4A, 4B, 4C depict flowcharts illustrating alternative embodiments for authorizing a Mission Critical Services (MCX) server, in accordance with some embodiments of the present disclosure; and FIG. 5 illustrates an MCData message store functional model, in accordance with some embodiments of the present disclosure.

Figure 1:
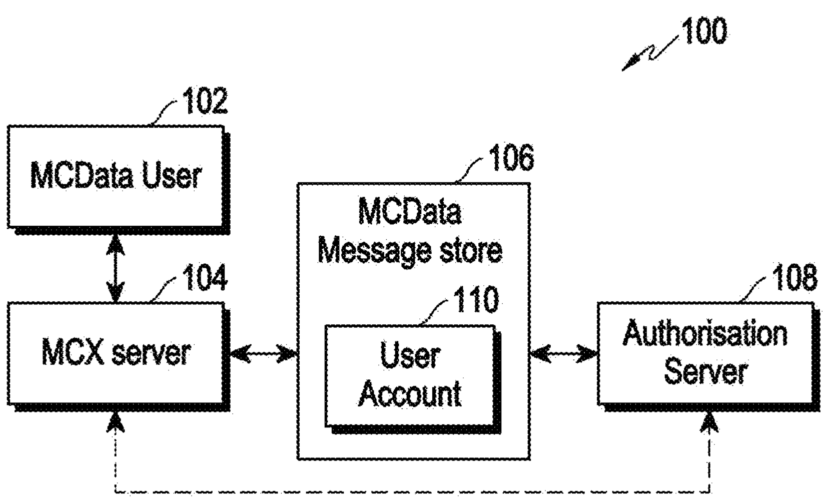
FIG. 1 depicts a schematic representation of an environment for authorizing a Mission Critical Services (MCX) server, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

MODE FOR INVENTION

In the present document, the word "exemplary" is used herein to mean "Serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises" "comprising" "includes" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 depicts a schematic representation of an environment 100 for authorizing a Mission Critical Services (MCX) server 104, in accordance with some embodiments of the present disclosure.

The environment 100 comprises a MCData user 102, the MCX server 104, a Mission Critical (MC) Data message store 106, an authorization server 108, a user account 110 and the like. In an embodiment, the MCData message store 106 is a network base persistent store that allows Mission Critical system to configure the MCData user 102 to permanently store their MCData communications. In the context of the present disclosure, the terms "MCData user" "MCX user" and "user" may be used interchangeably, but all the terms provide the same meaning. The MCData user 102 having the user account 110 with the MCData message store 106 as shown in the FIG. 1 may communicate with the MCData message store 106 to access storage area of the MCData message store 106 the MCData user 102 is authorized to access. The MCX server 104 may be associated with the MCData user 102, and the MCData message store 106 deposit messages and files exchanged in the conversation to the MCData user's storage area in the MCData message store 106 via a communication network (not shown in FIG. 1). The communication network may be at least one of a wired communication network and a wireless communication network. The MCX server 104 may be configured to perform one or more actions on the user account such as deposit messages and files exchanged in the conversation to the MCData user's storage area in the MCData message store 106. In the context of the present disclosure, the term "MCX server" and "MCData server" may be interchangeably used, but the terms provide the same meaning. In some embodiments, the MCData communications and files may be stored in the MCData message store 106 against MCData user identifier of the MCData user 102. In some embodiments, the MCX server 104 may be authorized by the authorization server 108 based on the consent of the MCData user 102.

In an embodiment of the present disclosure, the MCData message store 106 may receive a user account access request from the MCX server 104. In some embodiments, the user account access request received from the MCX server 104 may include, but not limited to, a request to access the user account corresponding to the MCData User Identifier (ID) in the MCData message store 106 and identification information of the MCX server 104. The MCData User ID is an identifier for the user account created for the MCData user 102. In some embodiments, data associated with the MCData user 102 may be stored in the MCData message store 106 against the MCData user ID. Further, the MCData message store 106 may transmit a validation request to the authorization server 108 associated with the MCData message store 106, upon receiving the user account access request from the MCX server 104. In some embodiments, the MCX server 104 may share the access information directly to the authorization server 108 as depicted by the dotted lines in the FIG. 1.

In some embodiments, the authorization server 108 may be a separate entity which is associated with the MCData message store 106. In some other embodiments, the authorization server 108 may be configured in the MCData message store 106 itself. In yet other embodiments, the authorization server 108 could be a configuration server associated with the MCData message store 106, a new network function associated with the MCData message store 106 and the like. The authorization server 108 may receive the validation request from the MCData message store 106 user account access request. The validation request may include, but not limited to, identification information of the MCX server 104 and the MCData User ID. In some embodiments, the authorization server 108 may receive the access information of the user account from a user device as pre-requisite for authorization process through Hyper Text Transfer Protocol (HTTP). However, this should not be construed as a limitation since any other protocol that is capable of carrying the access information to the authorization server 108 may be used instead of HTTP. In some embodiments, when the authorization server 108 is configured in the MCData message store 106, the access information of the user account 110 may be directly received and stored by the MCData message store 106. Further, the authorization server 108 may validate the identification information of the MCX server 104 based on the access information of the user account 110 corresponding to the MCData User ID stored in the authorization server 108. In some embodiments, the authorization server 108 may compare the identification information of the MCX server 104 with the access information of the user account 110 corresponding to the MCData User ID. Based on the comparison, the authorization server 108 may detect presence of the identification information of the MCX server 104 in the access information of the user account 110 as the presence indicates successful validation. Thereafter, if the presence of the identification information of the MCX server 104 is detected, the authorization server 108 may transmit a validation response to the MCData message store 106 indicating authorization of the MCX server 104 to access the user account 110 in the MCData message store 106.

Figure 2A:
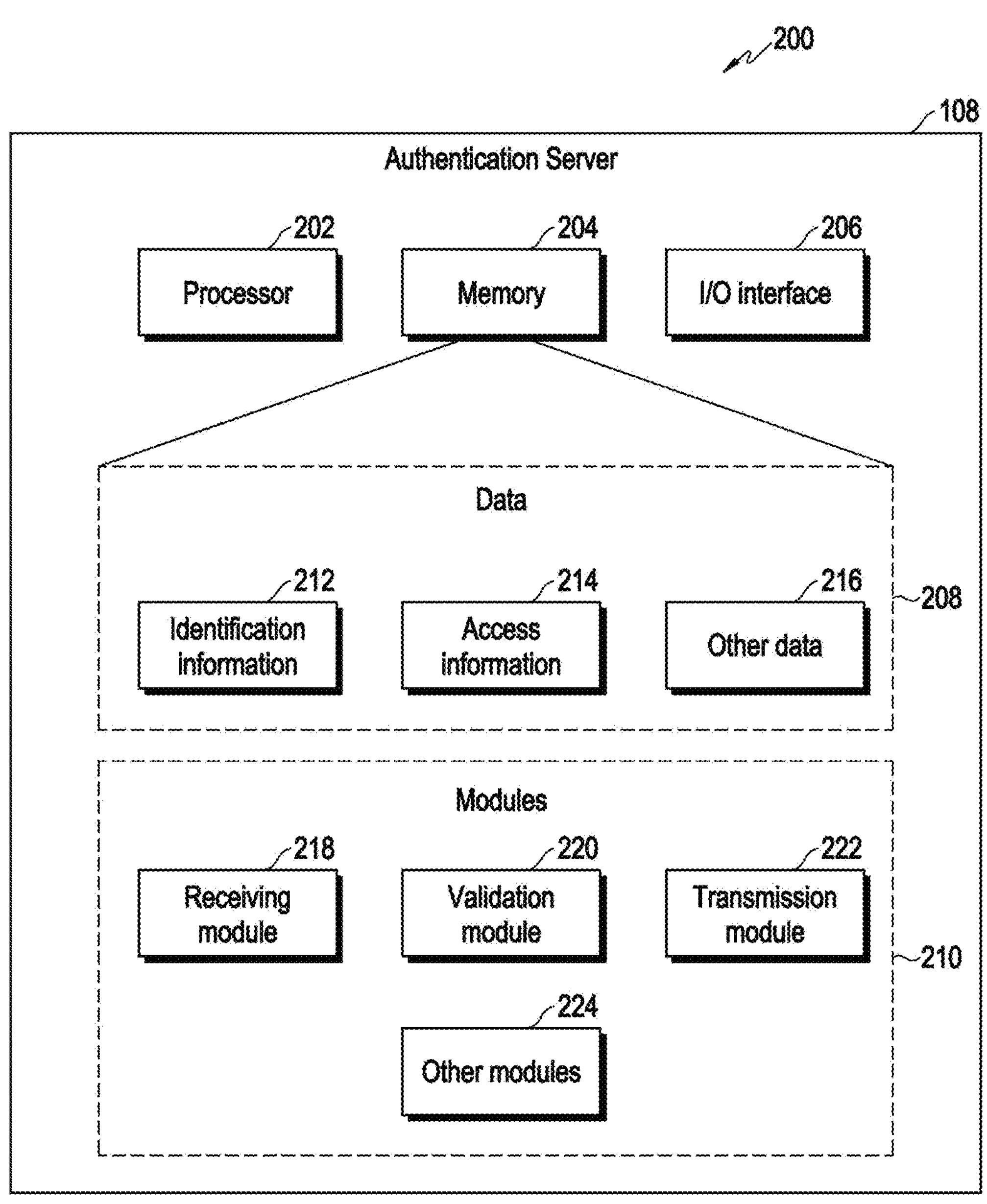
FIG. 2A depicts a detailed block diagram of an authorization server for authorizing a Mission Critical Services (MCX) server, in accordance with some embodiments of the present disclosure.

FIG. 2A depicts a detailed block diagram 200 of an authorization server 108 for authorizing a Mission Critical Services (MCX) server 104, in accordance with some embodiments of the present disclosure.

In an embodiment, the authorization server 108 may include a processor 202, a memory 204 and an I/O Interface 206. The I/O interface (or transceiver) 206 may be configured for receiving and transmitting an input signal or/and an output signal related to one or more operations of the authorization server 108. The memory 204 may be communicatively coupled to the processor 202 and one or more modules 210. The processor 202 may be configured to perform one or more functions of the authorization server 108 for performing multiple-turn actions using data 208 and the one or more modules 210.

In an embodiment, the data 208 stored in the memory 204 may include, without limitation, values/texts related to identification information 212, access information 214 and other data 216. In some implementations, the data 208 may be stored within the memory 204 in the form of various data structures. Additionally, the data 208 may be organized using data models. The other data 216 may include various temporary data and files generated by the different components of the authorization server 108.

In an embodiment, the identification information 212 is a unique identifier and related information of the MCX server 104 that helps the authorization server 108 to identify the MCX server 104 during the validation in authorization process. The identification information 212 may be of the form, but not limited to, Uniform Resource Identifier (URI) of the MCX server 104, identifier of the MCX server 104, and public service identity of the MCX server 104. The identification information 212 is validated based on the access information 214 of a user account 110 corresponding to the MCData User Identifier (ID) stored in the authorization server 108. For example, the URI, the identifier, and the public server identity may be in the form such as but not limited to "sip:mcxserver@example.org"

In an embodiment, the access information 214 of the user account 110 is the information that enables the authorization server 108 to identify a plurality of MCX servers that are allowed by the MCData user 102 to have access to the corresponding user account 110. The access information 214 of the user account 110 may include, but not limited to, a list of URIs, identifiers and public service identities of a plurality of MCX servers authorized by a user to access the user account 110 in the MCData message store 106. The access information 214 of the user account 110 may be received from a user device as a pre-requisite through Hyper Text Transfer Protocol (HTTP) for the authorization process. In some embodiments, the authorization server 108 may validate the MCX server by comparing the identification information 212 of the MCX server 104 with the access information 214 of the user account 110.

In an embodiment, the other data 216 may include, but not limited to, a validation request, a validation response, a user account access request and the like that may be temporarily stored in the authorization server 108. In some embodiments, the user account access request may include, but not limited to, a request to access the user account 110 corresponding to the MCData User ID in the MCData message store 106 and the identification information 212 of the MCX server 104. In some embodiments, the validation request may include, but not limited to, the identification information 212 of the MCX server 104 and the MCData User ID. In some embodiments, the validation response to the MCData message store 106 indicates authorization of the MCX server 104 to access the user account 110 in the MCData message store 106, upon successful validation of the identification information 212 of the MCX server 104.

In an embodiment, the data 208 may be processed by the one or more modules 210 of the authorization server 108. In an implementation, the one or more modules 210 may include, without limiting to, a receiving module 218, a validation module 220, a transmission module 222 and other modules 224. In an embodiment, the other modules 224 may be used to perform various miscellaneous functionalities of the authorization server 108. It will be appreciated that such one or more modules 210 may be represented as a single module or a combination of different modules.

Figure 2B:
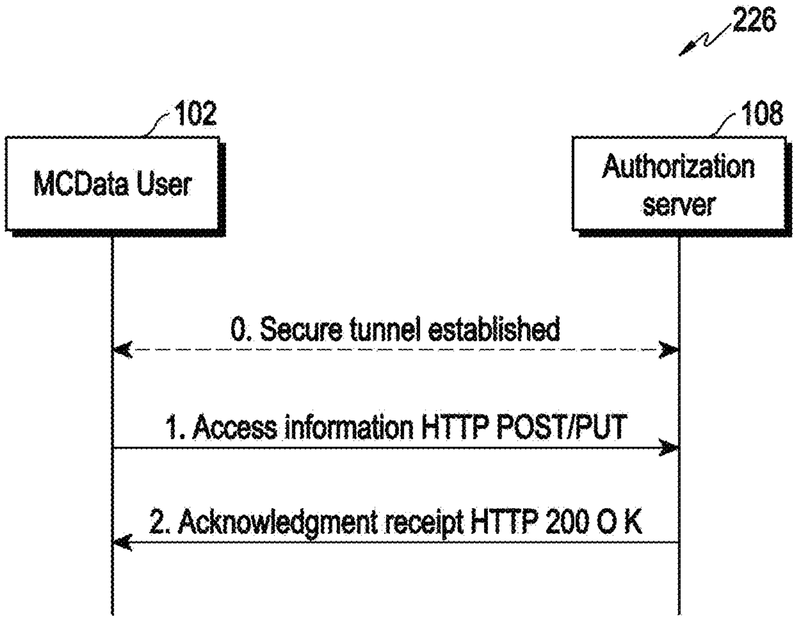
FIG. 2B depicts a flowchart illustrating a method to send access information to an authorization server, in accordance with some embodiments of the present disclosure.

In an embodiment, the receiving module 218 may be configured to receive a validation request from the Mission Critical (MC) Data message store 106 in response to a message access request received by the MCData message store 106 from the MCX server 104. The validation request may include, but not limited to, identification information 212 of the MCX server 104 and the MCData User ID. In some embodiments, the MCData user ID may enable the MCData message store 106 and the authorization server 108 to identify the user account 110 that the MCX server 104 desires to access. In some embodiments, the MCX server 104 may send the user account access request to the MCData message store 106 for accessing at least one of, but not limited to, messages of the user stored in the user account 110, other data stored in the user account 110, and to modify data stored in the user account 110 by performing actions such as adding, deleting, replacing and the like. In some embodiments, user related to the user account 110 may provide the access information 214 to the authorization server 108 as a pre-requisite to the authorization process to indicate list of the plurality of MCX servers that can be provided access to the user account 110. The authorization server 108 may refer to the access information 214 when the MCX server 104 sends a user account access request to access the user account 110 stored in the MCData message store 106. Therefore, the receiving module 218 may be further configured to receive the access information 214 of the user account 110 from the user device as pre-requisite for the authorization process. In some embodiments, the access information 214 may be received through, but not limited to, Hyper Text Transfer Protocol (HTTP). The process of sending access information 214 to an authorization server 108 as a pre-requisite, is depicted via a flowchart 226 in accordance with some embodiments of the present disclosure, in FIG. 2B.

At step 1, MCData user 102 sends the access information 214 to the authorization server 108. In some embodiments, the access information 214 is shared through Hyper Text Transfer Protocol (HTTP) put/post. Prior to sharing the access information 214, a secure communication tunnel may be established between the MCData user 102 and authorization server 108 in the Mission Critical Services Environment using Hyper Text Transfer Protocol Secure (HTTPS). The MCData user 102 and the authorization server 108 may utilize the secure communication tunnel for secure communication of the access information 214. Upon receiving the access information 214 at step 2, the authorization server 108 sends an acknowledgement indicating a receipt of the access information 214. The HTTP 200 OK indicates the receipt of the access information in the FIG. 2B.

In some other embodiments, the MCData user 102 may share the access information 214 to the MCData message store 106 and the MCData message store 106 may send the access information 214 to the authorization server 108. Thereafter, the access information 214 may be stored in the authorization server 108.

In an embodiment, the validation module 220 may be configured to validate the identification information 212 of the MCX server 104 based on the access information 214 of the user account 110 corresponding to the MCData User ID stored in the authorization server 108. To validate the identification information 212, the validation module 220 may compare the identification information 212 of the MCX server 104 with the access information 214 of the user account 110 corresponding to the MCData User ID. Based on the comparison, the validation module 220 may detect presence of the identification information 212 of the MCX server 104 in the access information 214 of the user account 110. In some embodiments, presence of the identification information 212 of the MCX server 104 in the access information 214 of the user account 110 indicates successful validation of the identification information 212. In some embodiments, successful validation may indicate that the MCX server 104 that desires to access the user account 110 in the MCData message store 106 is authorized to access the user account 110 in the MCData message store 106. However, for unsuccessful validation, the authorization server 108 may deny the MCX server 104 to access the user account 110 in the MCData message store 106 as it is unauthorized.

Henceforth, the process of authorizing MCX server 104 is explained with the help of one or more examples for better understanding of the present disclosure. However, the one or more examples should not be considered as limitation of the present disclosure.

Consider an exemplary scenario wherein as a prerequisite, MCData user 1 sends the access information 214 comprising URI 1 of MCX server 1, identifier of MCX server 1 and public server identifier of MCX server 1 through Hyper Text Transfer Protocol to the authorization server 108 as shown in TABLE 1. The TABLE 1 comprises MCData user ID 1 associated with the user account, each row indicates URI, Identifier, and public server identifier of the MCX servers 1-4 which are allowed to have access to the user account of MCData user 1.

TABLE 1

| MCData User ID 1 | |
|---|---|
| MCX Server 1 | URI 1 of MCX server 1<br>Identifier of MCX Server 1<br>Public server identity of MCX Server 1 |
| MCX Server 2 | URI 2 of MCX server 2<br>Identifier of MCX Server 2<br>Public server identity of MCX Server 2 |
| MCX Server 3 | URI 3 of MCX server 3<br>Identifier of MCX Server 3<br>Public server identity of MCX Server 3 |
| MCX Server 4 | URI 4 of MCX server 4<br>Identifier of MCX Server 4<br>Public server identity of MCX Server 4 |

Thereafter, consider, the MCX server 2 sends the user account access request to the MCData Message store 106 to access the user account associated with the MCData user 1. The MCData user 1 is identified by MCData user ID 1. The user account access request comprises MCData User ID 1 and URI of the MCX Server 2. Upon receiving the user account access request, the MCData message store 106 sends a validation request to the authorization server 108 to validate the details of the MCX server 2. The authorization server 108 fetches the access information 214 associated with the MCData user 1 based on the MCData user ID 1 and compares the access information 214 with the received URI of the MCX server 2. Based on the comparison, as the URI of MCX server 2 is present in the access information 214, the authorization server 108 sends a validation response indicating authorization to the MCX server 2 to access the user account associated with the MCData user ID 1 to the MCData message store 106. Next, the MCData message store 106 provides the access to the user account.

Consider another example such that MCX server 6 sends a request to access a MCData a user account 1. Similarly, as described above, based on the comparison, the authorization server 108 determines the identifier of MCX Server 6 is not present in the access information associated with the user account 1. Therefore, the authorization server 108 shares the validation response to the MCData message store indicating the MCX server 6 as unauthorized to access the user account 1 in MCData message store 106.

Figure 3:
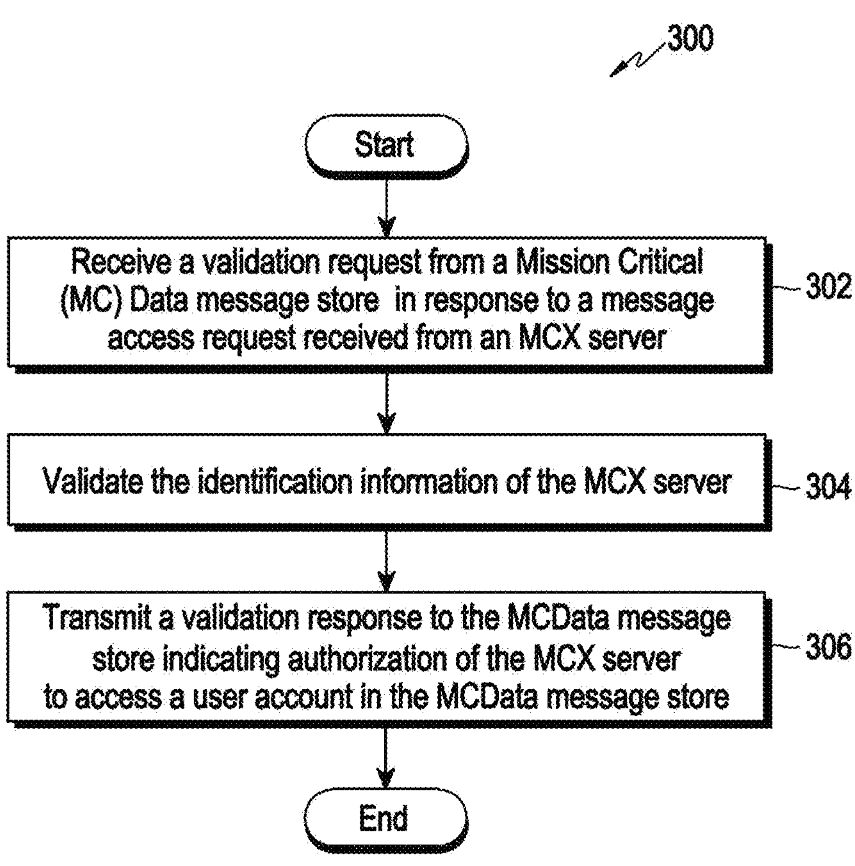
FIG. 3 depicts a flowchart illustrating a method for authorizing a Mission Critical Services (MCX) server, in accordance with some embodiments of the present disclosure.

FIG. 3 depicts a flowchart illustrating a method 300 for authorizing a Mission Critical Services (MCX) server 104, in accordance with some embodiments of the present disclosure.

As illustrated in FIG. 3, the method 300 includes one or more blocks illustrating a method of authorizing the MCX server 104. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 302, the method comprises receiving, by a processor 202 of an authorization server 108 associated with a Mission Critical (MC) Data message store 106, a validation request from the MCData message store 106 in response to a user account access request received by the MCData message store 106 from the MCX server 104. In some embodiments, the validation request may include, but not limited to, identification information 212 of the MCX server 104 and MCData User Identifier (ID). The user account access request received from the MCX server 104 may include, but not limited to, a request to access a user account 110 corresponding to the MCData User ID in the MCData message store 106 and the identification information 212 of the MCX server 104. In some embodiments, the identification information 212 of the MCX server 104 may include, but not limited to, Uniform Resource Identifier (URI) of the MCX server 104, identifier of the MCX server 104 and public service identity of the MCX server 104.

At block 304, the method comprises, validating, by the processor 202, the identification information 212 of the MCX server 104 based on access information 214 of the user account 110 corresponding to the MCData User ID stored in the authorization server 108. In some embodiments, the authorization server 108 receives the access information 214 of the user account 110 from a user device as a pre-requisite for authorization process through Hyper Text Transfer Protocol (HTTP). The access information 214 of the user account 110 may include, but not limited to, a list of URIs, identifiers and public service identities of a plurality of MCX servers authorized by a user to access the user account 110 in the MCData message store 106. Thus, to validate the identification information 212 of the MCX server 104, the processor 202 may compare the identification information 212 of the MCX server 104 with the access information 214 of the user account 110 corresponding to the MCData User ID. The authorization server 108 further detects presence of the identification information 212 of the MCX server 104 in the access information 214 of the user account 110 based on the comparison. In some embodiments, presence of the identification information 212 of the MCX server 104 in the access information 214 of the user account 110 indicates successful validation, which is a condition to be satisfied to authorize the MCX server 104 to access the user account 110 stored in the MCData message store 106.

At block 306, the method comprises, transmitting, by the processor 202, a validation response to the MCData message store 106 indicating authorization of the MCX server 104 to access the user account 110 in the MCData message store 106, upon successful validation of the identification information 212 of the MCX server 104.

Figure 4A:
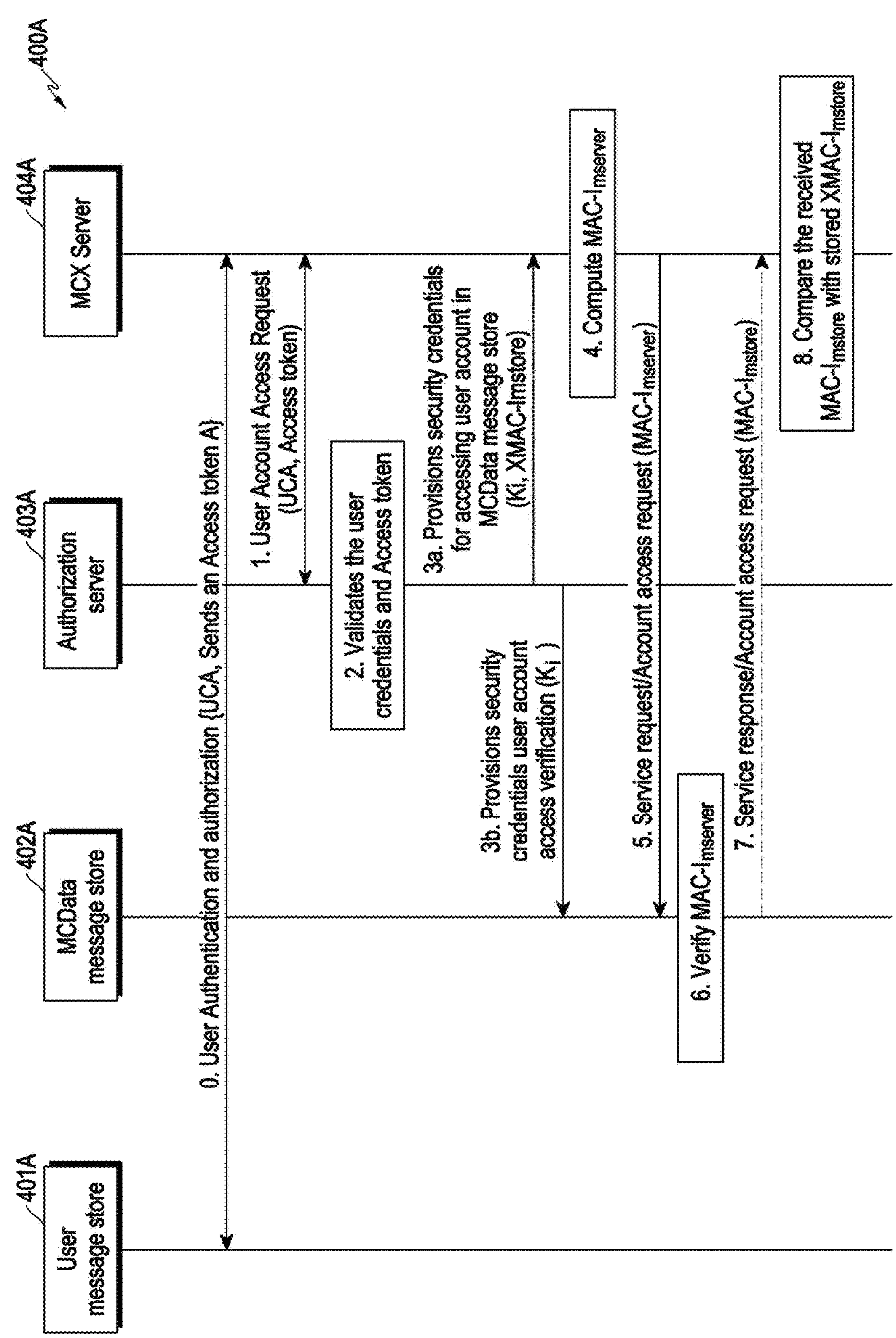

FIGS. 4A-C depicts 400A-C illustrating alternative embodiments for authorizing a Mission Critical Services (MCX) server 404A-C, in accordance with some embodiments of the present disclosure.

FIG. 4A depicts a flowchart 400A illustrating an alternative embodiment for authorizing the Mission Critical Services (MCX) server 404A.

At step zero, a MCX user associated with an MCData user ID and the MCX server 404A performs user authentication and authorization. In some instances, the MCX user sends user credentials to the MCX server 404A along with an access token obtained from an authorization server 403A for accessing MCX services.

A user message store 401A associated with the MCX user shares User Credentials Assertion (UCA) as a token signed by the MCX user. Further, the user message store 401A enables the MCX user to authenticate at the receiving end point by including the signed token during service request.

Further, the user message store 401A includes the MCData user ID which may be checked against a certificate by the MCX server 404A. As an example, the UCAs are JSON WEB tokens as described in, for instance, RFC 7519 and are secured with digital signatures based on a JSON Web Signature (JWS) as described in, for instance, RFC 7515. The UCA may include the MCData user ID, a timestamp and an expiration time, and the request type, i.e., the type "indirect authorization"

The MCX user digitally signs the generated UCA based on the MCX user private key as described in the RFC 7515. The signed UCA may include one of the following fields certificate chains used for signing the UCA. The steps for verification of the UCA performed by the MCX server 404A may be as follows:

The MCX server 404A may validate the signature of JWS as described in the RFC 7515.

The MCX server 404A may validate the timestamp and/or the expiration time as described in the RFC 7519.

The MCX server 404A verifies that the MCData user ID in the UCA which matches the MCData user ID in the public key certificate is used for signing the UCA. The MCX server 404A verifies the access token as well.

Upon successful verification of the UCA and the access token, at step one, the MCX server 404A sends a user account access request to the authorization server 403A along with the UCA and the access token obtained from the MCX user.

In an embodiment, the authorization server 403A may be an identity management server in a MCX domain, or the authorization server 403A hosted by an operator or a third-party. In an embodiment, the authorization server 403A may be pre-provisioned with the certificates to verify the UCA and the access token. For authorization purpose, access token such as access token A may be used instead of the MCX server 404A for validating the UCA. In another embodiment, the MCX user sends an indication during user authentication and authorization. This indicates the MCX server 404A about the user account 110 created at MCData message store 402A. In an embodiment, the indication may include, but not limited to, a user account ID or a username or any pseudo name assigned to identify the user account 110. The format and generation of this user account ID or username or any pseudo name is not specified in this document.

Upon receiving the user account access request, at step two, the authorization server 403A validates the UCA with the certificate and verifies the access token A.

Upon successful validation of the UCA and the access token A, at step three, the authorization server 403A provides the MCX server 404A and the MCData message store 402A with security credentials required to authorize the MCX server 404A to access the MCData message store 402A associated with the MCX user. In an embodiment, the authorization server 403A sends a root key $K_i$ and/or a generated XMAC-Imstore using same root key to the MCX server 404A. In another embodiment, the authorization server 403A computes the XMAC-Imstore using a MCData Payload Protection Key (DPPK). In this case the XMAC-Imstore may be the signalling payload key (SPK) available to protect the signalling payload between servers as follows:

$MAC\text{-}I_{mserver}$ Computation

Input 1=Access token,

Input 2=Counter_mserver

The input key KEY is $K_i$. In another embodiment, the MCX server 404A computes the $MAC\text{-}I_{mstore}$ using the MCData Payload Protection Key (DPPK). In this case, the $MAC\text{-}I_{mstore}$ may be the Signalling Payload Key (SPK) available to protect the signalling payload between servers. The MCData message store 402A and the MCX server 404A is associated with a 16-bit counter, Counter_mstore and Counter_mserver, with every new $K_i$ provided by the authorization server 403A. To generate the MAC-$I_{mserver}$ and MAC-$I_{mstore}$, these Counters are used as one of the inputs. The Counter is incremented for every new computation of the MAC-I so as to be used as freshness input.

Upon receiving the root key, at step four, the MCX server 404A computes the MAC-$I_{mserver}$ using the root key or the SPK. The MCX server 404A temporarily stores the expected XMAC-$I_{mstore}$.

At step five, the MCX server 404A sends a request message such as service request or an account access request to the MCData message store 402A including the MAC-$I_{mserver}$.

Upon receiving the request message, at step six, the MCData message store 402A calculates the MAC-$I_{mserver}$ in the same way as the MCX server 404A and may verify whether the MAC-$I_{mserver}$ matches the received MAC-$I_{mserver}$ values.

At step seven, if the MCX server 404A requests an acknowledgement from the MCX user, the MCData message store 402A generates the MAC-$I_{mstore}$ and includes the generated the MAC-$I_{mstore}$ in a response message.

Upon receiving the response, at step eight, the MCX server 404A compares the received MAC-$I_{mstore}$ with an expected XMAC-$I_{mstore}$ that the User Data Message (UDM) which is stored temporarily in step 4.

FIG. 4B depicts a flowchart 400B illustrating another alternative embodiment for authorizing the Mission Critical Services (MCX) server 404B.

At step zero, a MCX user associated with a user message store 401B and the MCX server 404B performs user authentication and authorization. During this procedure, the MCX user sends user credentials to the MCX server 404B along with the access token such as an access token A obtained from an authorization server 403B for accessing MCX services. The user message store 401B sends User Credentials Assertion (UCA) as a token signed by the MCX user. Further, the user message store 401B enables the MCX users to authenticate a receiving end point by including the signed token during a service request. The signed token includes the MCData user ID that may be checked against a certificate by the MCX server 404B. The UCAs are JSON Web Tokens as described in, for instance, RFC 7519 and are secured with digital signatures based on JSON Web Signature (JWS) as described in, for instance, the RFC 7515. The UCA may include the MCData user ID, a timestamp and an expiration time, and the request type, i.e., the type "indirect authorization" The MCX user digitally signs the generated UCA based on MCX user private key as described in the RFC 7515. The signed UCA may include one of the following fields certificate chains used for signing the user authentication assertion. The verification of the UCA performed by the MCX server 404B is as follows:

The MCX server 404B validates the signature of the JWS as described in RFC 7515.

The MCX server 404B validates the timestamp (iat) and/or the expiration time (exp) as specified in RFC 7519.

The MCX server 404B verifies that the MCData user ID in the UCA that matches MCData user ID in the public key certificate used for signing the UCA. The MCX server 404B verifies the access token A as well.

After successful verification of the UCA and the access token A, at step one, the MCX server 404B sends an access token request to the authorization server 403B along with the UCA and the access token A obtained from the MCX user to access a MCData message store 402B. In an embodiment, the authorization server 403B may be an identity management server in the MCX domain, or the authorization server 403B hosted by an operator or a third party. In an embodiment, the authorization server 403B may be pre-provisioned with the certificates to verify the UCA and the access token A. For authorization purpose, the access token A may be used instead of the MCX server 404B for validating the UCA. In another embodiment, the MCX user sends an indication during user authentication and authorization. This indication indicates the MCX server 404B about the user account 110 created at the MCData message store 402B. In an embodiment, the indication may be such as but not limited to a user account ID or username, or any pseudo name assigned to identify the user account 110.

Upon receiving the access token request, at step two, the authorization server 403B validates the UCA with the appropriate certificate and verifies the access token A.

In another embodiment, the authorization server 403B is pre-configured with the MCX server URIs/MCX server identities which are authorized to request for the access token A. In an embodiment, the pre-configured information contains MCX server details which are authorized to access the MCData message store 402B.

Upon successful validation of the UCA and the access token A, at step three, the authorization server 403B sends an access token B to the MCData message store 402B. In an embodiment, the MCX server 404B is given WRITE/READ permission to the user account 110 in the MCData message store 402B. In another embodiment, the MCX server 404B is given WRITE/READ/UPDATE permission to the user account 110 in the MCData message store 402B. The term UPDATE signifies that if the MCData communication is stored as file, the MCX server 404B may have the ability to alter the file and/or add information to the user account 110 instead of altering an existing file. Such granularity of permission may be a part of scope of the access token.

At step four, the MCX server 404B sends a request message such as service request message or an account access request message to the MCData message store 402B including the access token B.

Upon receiving the request message, at step five, the MCData message store 402B on successful verification of the access token B, the MCData message store 402B allows the MCX server 404B to access the user account 110.

FIG. 4C depicts a flowchart 400C illustrating another alternative method for authorized message store access by MCX server 404C by using Common Application Programming Interface framework (CAPIF), in accordance with some embodiments of the present disclosure.

In some embodiments, at step 0, mutual authentication based on client and server certificates may be established using Transport Layer Security (TLS) between the MCX server 404C and a CAPIF core function 405. The MCX server 404C may send CAPIF-2/2e security capability information to the CAPIF core function 405 in a security method request message, indicating the list of security methods that the MCX server 404C supports over CAPIF-2/2e reference point for MCData message store 402B. The CAPIF core function 405 selects a security method to be utilized over CAPIF-2/2e reference point.

After successful establishment of TLS session over CAPIF-1 at step one, the MCX server 404C sends an access token request message to the CAPIF core function 405 as per, for instance, OAuth 2.0 specification.

At step two, the CAPIF core function 405 verifies the access token request message as per, for instance, OAuth 2.0 specification.

If the CAPIF core function 405 successfully verifies the access token request message, at step three, the CAPIF core function 405 generates an access token specific to the MCX server 404C to access MCData message store 402C and returns an access token response message.

At step four, on CAPIF-2e, the MCX server 404C authenticates the MCData message store 402C by establishing the TLS session with the MCData message store 402C based on an authentication and authorization method (i.e., server-side certificate authentication or certificate-based mutual authentication) as indicated by the CAPIF core function 405.

Upon successful authentication, at step five, the MCX server 404C initiates any one of service access request or a user account create request or a user account update request. The access token received from the CAPIF core function 405 is sent in the request.

At step six, the MCData message store 402C validates the access token. The MCData message store 402C verifies the integrity of the access token by verifying a CAPIF core function signature. If validation of the access token is successful, the MCData message store 402C verifies the request sent by the MCX server 404C against the authorization claims in the access token.

Upon successful verification of the access token and authorization claims of the MCX server 404C, at step seven, the MCData message store 402C sends a response message acknowledging the successful authorization of the MCX server 404C.

FIG. 5 illustrates a functional model 500 of a MCData message store 106, in accordance with some embodiments of the present disclosure. An interface may be introduced between the MCData message store 106 and a capability function to exchange security credentials or access information 214 of a user account 110. In an embodiment, an alternative may be derived by combining aspects from different alternatives.

In the present disclosure, the authorization server has been introduced to provide additional layer of security to a user account with the Mission Critical Data and is configured to validate identification information received in a user account access request. This authorization process by the authorization servers helps in such a way that only if the identification information is valid, the access is provided to the MCX server to access the user account. Further, the present disclosure may provide another additional layer of security to the user account such that validation of the user account access request by the authorization server is performed based on the access information provided by the MCData user associated with the user account. This way if an unauthorized MCX server sends the user account access request which is not present in the access information, the access is denied by the authorization server. Also, since the access information is provided by the MCData user as a pre-requisite to the authorization server or the MCData message store, the authorization server need not seek approval of the MCData user in real-time for every user account access information received from MCX servers. Therefore, the present disclosure improves user experience along with providing security to the user account.

In light of the technical advancements provided by the disclosed method and the control module, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

TABLE 2

Referral Numerals:

| Referral number | Description |
|---|---|
| 102 | MCData User |
| 104 | MCX Server |
| 106 | MCData Message Store |
| 108 | Authorization Server |
| 202 | Processor |
| 204 | Memory |
| 206 | I/O interface |
| 208 | Data |
| 210 | Modules |
| 212 | Identification Information |
| 214 | Access Information |
| 216 | Other data |

TABLE 2-continued

| Referral Numerals: | |
|---|---|
| Referral number | Description |
| 218 | Receiving Module |
| 220 | Validation Module |
| 222 | Transmission Module |
| 224 | Other modules |
| 401A, 401B | User Message Store of alternative embodiments |
| 402A, 402B, 402C | MCData Message Store of alternative embodiments |
| 403A, 403B | Authorization Server of alternative embodiments |
| 404A, 404B, 404C | MCX Server of alternative embodiments |
| 405 | CAPIF core function of alternative embodiments |

The invention claimed is:

1. A method performed by a mission critical (MC) Data message store in a wireless communication system, the method comprising:

receiving a user account request from a mission critical services (MCX) server, wherein the user account request includes an identifier of an MCData user;

validating the MCX server based on a plurality of uniform resource identifiers (URIs) of MCX servers related to the MCData user; and transmitting, to the MCX server, a user account response corresponding to the identifier of the MCData user.

2. The method of claim 1, wherein the user account request further includes identification information of the MCX server, and wherein the identification information of the MCX server comprises at least one of a uniform resource identifier (URI) of the MCX server, an identifier of the MCX server, or a public service identity of the MCX server.

3. The method of claim 2, wherein the user account request comprises a request to access a user account corresponding to the MCData user and the identification information of the MCX server.

4. The method of claim 2, further comprising:

validating the identification information of the MCX server based on access information of a user account corresponding to the MCData user, wherein the access information of the user account comprises at least one of identifiers or public service identities of a plurality of MCX servers authorized to access the user account in the MCData message store.

5. The method of claim 4, wherein validating the identification information of the MCX server comprises:

comparing the identification information of the MCX server with the access information of the user account corresponding to the MCData user; and detecting presence of the identification information of the MCX server in the access information of the user account based on the comparison, wherein the presence indicates successful validation.

6. The method of claim 4, further comprising:

receiving the access information of the user account from a user equipment as a pre-requisite for an authorization process.

7. The method of claim 6, wherein the access information of the user account is received through hyper text transfer protocol (HTTP).

8. The method of claim 1, further comprising:

providing, to the MCX server, access to a user account in the MCData message store, in response to an authorization of the MCX server.

9. A mission critical (MC) data message store in a wireless communication system, the MCData message store comprising:

a transceiver; and a processor, wherein the processor is coupled to the transceiver and configured to:

receive a user account request from a mission critical services (MCX) server, wherein the user account request includes an identifier of an MCData user, validate the MCX server based on a plurality of uniform resource identifiers (URIs) of MCX servers related to the MCData user, and transmit, to the MCX server, a user account response corresponding to the identifier of the MCData user.

10. The MCData message store of claim 9, wherein the user account request further includes identification information of the MCX server, and wherein the identification information of the MCX server comprises at least one of a uniform resource identifier (URI) of the MCX server, an identifier of the MCX server, or a public service identity of the MCX server.

11. The MCData message store of claim 10, wherein the user account request comprises a request to access a user account corresponding to the MCData user and the identification information of the MCX server.

12. The MCData message store of claim 10, wherein the processor is further configured to validate the identification information of the MCX server based on access information of a user account corresponding to the MCData user, and wherein the access information of the user account comprises at least one of identifiers or public service identities of a plurality of MCX servers authorized to access the user account in the MCData message store.

13. The MCData message store of claim 12, wherein the processor is further configured to:

compare the identification information of the MCX server with the access information of the user account corresponding to the MCData user; and detect presence of the identification information of the MCX server in the access information of the user account based on the comparison, wherein the presence indicates successful validation.

14. The MCData message store of claim 12, wherein the processor is further configured to:

receive the access information of the user account from a user equipment as a pre-requisite for an authorization process.

15. The MCData message store of claim 14, wherein the access information of the user account is received through hyper text transfer protocol (HTTP).

16. The MCData message store of claim 9, wherein the processor is further configured to:

provide, to the MCX server, access to a user account in the MCData message store, in response to an authorization of the MCX server.

* * * * *